Dec. 26, 1967 H. C. SMITH 3,359,629

METHOD OF MAKING TAPE-HEADS

Filed Nov. 16, 1964 2 Sheets-Sheet 1

INVENTOR.
HUBERT COLIN SMITH
BY Kurt Kelman
AGENT

Dec. 26, 1967 H. C. SMITH 3,359,629
METHOD OF MAKING TAPE-HEADS
Filed Nov. 16, 1964 2 Sheets-Sheet 2
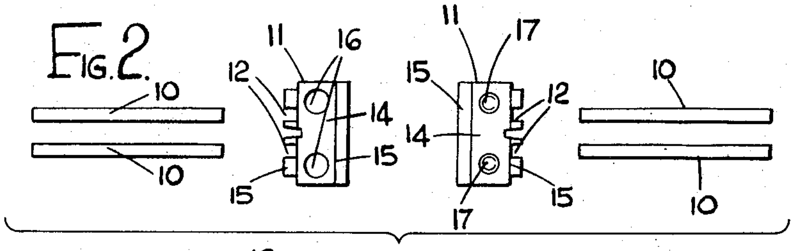
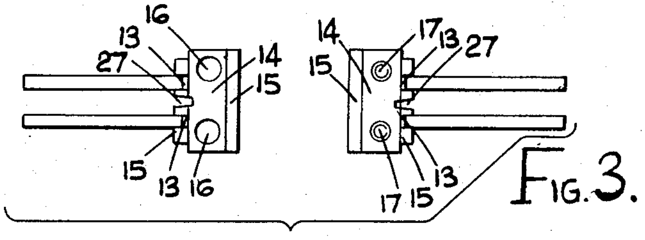
FIG. 3.
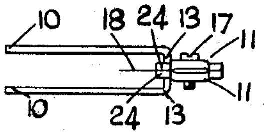
FIG. 4.
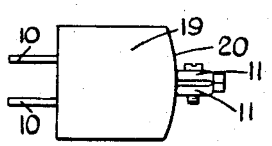
FIG. 5.
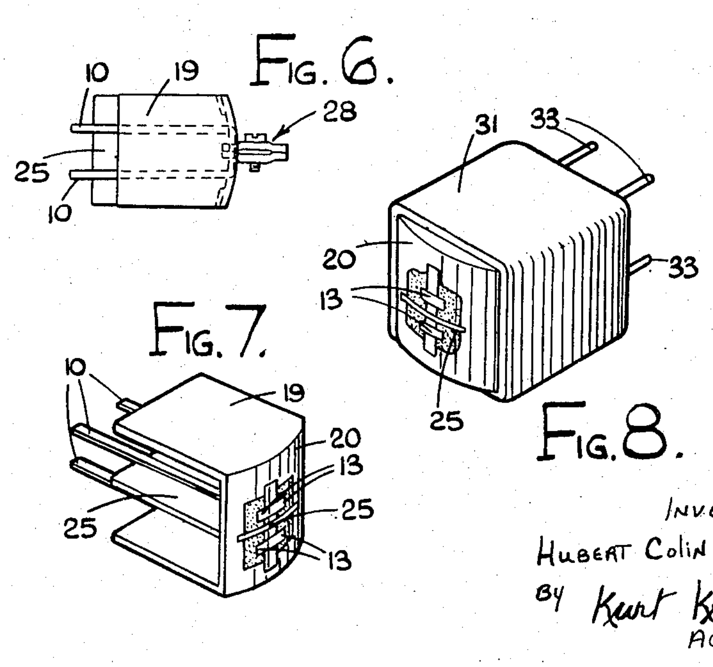
INVENTOR.
HUBERT COLIN SMITH
BY Kurt Kelman
AGENT

United States Patent Office 3,359,629
Patented Dec. 26, 1967

3,359,629
METHOD OF MAKING TAPE-HEADS

Hubert Colin Smith, Norton, Stourbridge, England, assignor to BSR Limited, Stafford, England, a British company Filed Nov. 16, 1964, Ser. No. 411,402
9 Claims. (Cl. 29—603)

The invention is a method of making tape-heads in which a sub-assembly of pole pieces held in predetermined relationship by a fixture member is first made and inserted within the housing of the tape head, the fixture member serving to locate the pole pieces relative to the housing and then the fixture member being machined away so as to expose the pole pieces, the gap size and alignment is then checked and if satisfactory the windings etc. are added and manufacture of the head completed.

This invention relates to magnetic sound recording and reproducing heads (hereinafter referred to briefly as "tape-heads") for use in conjunction with a tape or other form of elongated magnetisable record carrier (hereinafter all referred to under the generic expression "tape") which is moved longitudinally past and in contact with, or very close to, the pole faces of an electro-magnet separated by a narrow gap, the direction of movement being in the direction of the length of the gap i.e. the distance between the pole faces. Tape heads form part of the apparatus commonly known today under the expression "tape-recorder."

The invention is particularly concerned with the case of "multi-track" tapes which may be used for stereophonic recording and reproduction of sound and/or information which call for a tape head having two or more electro-magnets to cooperate with two or more separate "tracks" on the tape. In order to ensure absolute synchronism between the reproduction (or recording) of sound or information from the tracks it is necessary for the gaps (one for each electro-magnet) to be accurately in alignment along an axis which is at right angles to the direction of travel of the tape across the gap and for the pole faces of the electro-magnets to be in accurate alignment in all planes. In effect, the alignment between the gaps should be so accurate that each one is virtually a geometrical continuation of the others in all planes.

This requirement for accurate alignment of the gaps is the major factor which, hitherto, has led to the high cost of manufacture of this type of tape head. The existing methods of manufacture involve several intricate and time-consuming operations such as, the assembly of the laminated cores of the electro-magnets, the winding of the conductors, the insertion of screens and gap spacers, accurate machining and finishing of the pole faces and assembly of all the components into a housing which is quite small (roughly in size like a ½" cube in the case of a twin-track head). After completion each tape-head needs checking for alignment of the gaps and the gap length, and so far as I am aware, the existing methods of manufacture involve a very high rate of rejection at this checking stage and, as it is not practical to recover anything from a rejected tape-head, all the expense which has gone into its manufacture is lost and this loss is reflected in the subsequent high cost of those tape-heads which pass final checking.

It is the object of the present invention to provide an improved method of manufacture and an improved form of tape-head which will enable substantial reduction in the cost of manufacture of the tape-head without sacrificing any of the requirements for accurate alignment of the gaps of the electro-magnets.

The manner in which the method of manufacture according to the invention leads to substantial reduction in the cost of manufacture of tape-heads and the improved tape-head arising from such method of manufacture, will be gathered from the following detailed description which is given by way of example of one complete method of manufacture of a tape-head in accordance with the invention, although it will be understood that the steps of the method of manufacture and the detailed construction of a tape-head, are not limited to the precise details given hereinafter, as these are referred to by way of example only. The example is given in connection with a ¼-track tape head.

The example is illustrated in accompanying drawings wherein:

FIGURES 2 to 7 are views showing successive steps in the method of manufacture.

FIGURE 8 is a perspective view of the finished article.

Figure 1:
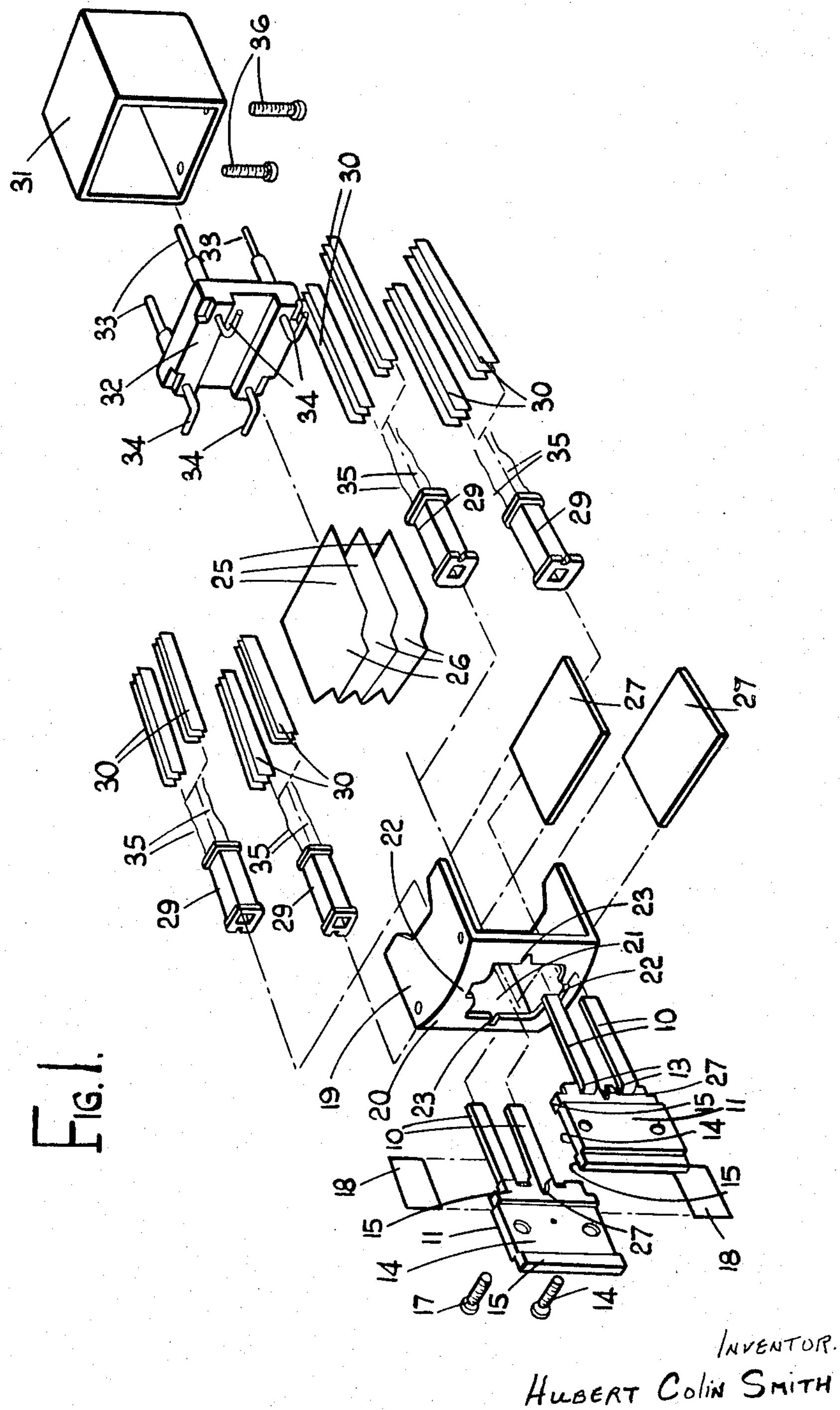
FIGURE 1 is an exploded view of a ¼-track tape-head showing also certain parts which are used in the method of manufacture but which are not present in the finished article.

At the commencement of manufacture there are provided four pole elements 10 two for each electro-magnet and these pole elements take the form of relatively thick Mumetal laminations such as of the order of .015" in thickness.

For each pair of such pole elements there is provided a fixture plate 11 and each such plate is made as a pressing of nickel silver and is of generally rectangular form but provided along one of its longer edges with two spaced apart recesses 12 each of which has a width dimension corresponding to the width of one of the pole elements 10. Each also has a further recess 27, referred to hereinafter.

Each pole element 10 has its one end bent at right angles to its length to form a lug 13 and then the two pole elements of each pair are rigidly attached to their associated fixture plates 11 by placing the lugs 13 in the said recesses 12 and holding the parts in a suitable fixture so that the two pole elements of each pair extend in a plane parallel to the plane of the fixture plate (see FIG. 3), each pole element having its lug 13 resting in one of the recesses 12 in the longitudinal edge of its associated fixture plate and with each assembly so held the pole elements 10 are secured to the fixture plates by a suitable soldering or brazing operation.

It will be observed that in the next step the centre portion 14 of each fixture plate is recessed or offset from the plane of the edge faces 15 and each fixture plate is then submitted to a surface grinding or other form of surface machining operation to provide accurately flat surfaces on these edge faces 15.

In the following description, for the purpose of clarity only, the method of manufacture and the construction of the tape-head, is given with reference to the tape-head occupying its normal operative position, that is to say, with its outer face in an upright plane and references to the horizontal direction hereinafter refer to the direction of movement of the tape as it will pass across the face of the tape-head whilst references to the vertical direction are to be taken as being in the direction of the vertical plane of the tape. However, this is for the purpose of ease of description only as it will be readily appreciated that the method of manufacture and also the function of the tape-head is in no way dependent upon the actual orientation of the tape-head in respect to any particular plane.

Referring back to FIGURE 1, each fixture plate when first produced is provided with two spaced apart holes, the pair of holes 16 in one plate being of larger diameter than the holes 17 in the other plate, which holes 17 are tapped, so that the holes 16 are clearance holes and in the next step of the operation (FIG. 4) the two fixture plates are clamped together by means of suitable screws 17*a* passing through the clearance holes 16 in the one fixture plate and screwing into the tapped holes 17 in the other fixture plate. Before the two plates are thus clamped together, two gap spacer elements 18 are inserted in position in between the machined flat surfaces 15 of the two plates and each gap spacer element is in the form of a piece of foil of beryllium copper of .0001" thickness.

These spacer elements 18 are positioned between the fixture plates so that one is located between the opposed lug 13 of each opposed pair of pole elements and they project outwardly for a short distance into the space between the two pairs of pole elements which are now extending away from the clamped together fixture plates in substantially parallel planes (see FIG. 4).

In the next step (FIG. 5) there is provided a housing member 19 formed of Mumetal and of generally U shape with the base of the U constituting the outer face 20 of the housing member and eventually constituting the outer surface of the tape-head. This outer face of the housing member has an external slightly convex form and is provided with a central opening 21 which is of rectangular shape but provided with notches in the sides thereof for the purposes hereinafter referred to (see FIG. 1).

In the upper and lower edges of the opening 21 in the outer face of the housing member there is provided a notch 22 in each edge, the two notches being accurately aligned along the central vertical axis of the opening 21 and also in the two side edges there is provided a notch 23 in each edge, these two notches begin accurately aligned along the central horizontal axis of the opening.

The sub-assembly of clamped fixture plate, pole elements and gap spacer elements (FIG. 4) is then assembled into the housing member 19 by passing the pole elements 10 through the rectangular opening in the housing member, from the front thereof, with the fixture plates 11 held vertically and engaging the vertical edges 24 of the fixture plates in the aforesaid notches 22 in the upper and lower edges of the rectangular opening 21 so that the pole elements 10 are then located in between the two parallel sides of the housing member 19 whilst the fixture plates are located to the outside of the front face of the housing member (see FIGURE 5).

There is then inserted in between the two pairs of pole elements a screening assembly comprising a suitable number, for example, three, Mumetal plates 25 placed on top of one another and each having a reduced width, forwardly extending tap 26 at one end which is engaged in the aforesaid notches 23 in the sides of the rectangular opening 21 so that the forward edges of these tabs 26 project slightly through the opening and into recesses 27 on the fixture plates, (see FIGURES 1 and 3) and the screening assembly of Mumetal plates 25 is located substantially in the horizontal plane between the two pairs of pole elements.

Also a pair of insulating plates 27 may be introduced at this stage to provide insulation between the pole elements and each side of the housing member 19 (see FIGURE 1). At this stage a suitable heat-resistant adhesive is applied around the front of the housing member to hold the assembly of fixture plates 11, housing member 19, screening plates 25, and insulating plates 27 rigidly together preparatory for the next step in the method of manufacture.

It will be appreciated at this stage that the clamped together fixture plates projecting from the front face of the housing member 19 constitute a jig or fixture 28 (FIGURE 6) which is accurately located in relation to the front face 20 of the housing member and is holding the pole face ends 13 of the pole elements rigidly in relation to one another with the gap spacer elements 18 also in position therebetween.

The complete assembly above described is then subjecting to machining operations including a finishing and lapping operation to completely remove all the metal of the projecting fixture plates and the projecting tabs 26 of the Mumetal spacer plates and so as to lap the pole face ends 13 of the pole elements accurately flush with the outer surface of the front face of the housing member (see FIG. 7). There are no electrical windings associated with this assembly (FIG. 7), therefore there exists no danger of damage to insulation, enabling a coolant to be used during these finishing and lapping procedures which is often precluded in other assemblies. At this stage therefore, the assembly can be checked for accurate alignment of the gaps between the pole faces 13 and in the event that there is a degree of misalignment such as to render the tape-head unacceptable for use, then the assembly so far prepared can be rejected and scrapped. It will be appreciated that rejection at this stage (FIG. 7) involves the loss of far less than rejection at the stage of a completely finished tape-head because rejection at this stage in the method according to the invention, none of the windings or extra laminations for the pole pieces has been introduced nor has the final assembly of the housing member into its container, and the coupling of the conductors to the terminals, been performed so that only a part of the work involved in the production of the complete tape-head needs to be lost if rejection has to occur at this stage, because of misalignment between the gaps.

However, it is considered that with the method according to the invention the amount of rejection occurring at this stage should be substantially reduced as compared with previous methods, owing to the method employed of using fixture plates to hold the gaps accurately in alignment right up to the stage of the final finishing to produce the pole faces flush with the outer surface of the housing member. In effect, the fixture plates perform the function of a destructible jig which acts to hold the gaps in alignment.

Furthermore, the method of producing the pole faces 13 results in relatively large areas of pole faces being provided for engagement by the tape as it moves across the front face of the tape-head and this has the advantage of giving good low frequency response of the tape-head in operation.

Further, the method of manufacture ensures that the Mumetal separating plates 25 forming the screen between the electromagnets extend right up to, and are flush with, the front face 20 of the housing member ensuring efficient screening between the electromagnets at the front surface of the housing member without any bi-section of their magnetic section.

At the next stage in the operation, the electrical conductor windings are placed about the pole elements and these would have been previously prepared; each set of windings being wound upon a suitable bobbin 29 having an axially extending centre aperture so that the wound bobbin 29 can be slipped over its associated pole element 10 and in the present instance four of such previously wound bobbins are placed over their respective pole elements (see FIG. 1).

The horizontal internal dimensions of the opening through each bobbin, are substantially greater than the cross-sectional dimensions of a pole element and after the bobbins have been placed in position, further laminations 30 are inserted to build up the required laminated core for each electromagnet.

These extra laminations 30 are in the form of thin strips of Mumetal which are inserted into the opening in the bobbin and a number of such laminations is inserted on each side of the pole element 10, the length of these extra laminations being such that they project beyond the ends of the bobbins 29 (remote from the pole faces 13) a sufficient distance to enable them to be bent inwardly and interleaved in overlapping relationship with the projecting ends of the laminations from the opposite bobbin so as to make up a complete core for the electromagnet consisting of these laminations bent to provide a U formation with the original pole elements in the centres of the two legs of the U. The addition of extra laminations to the core increases the cross-sectional area and due to the laminated assembly reduces eddy current and hysteresis loss that would occur in a core of solid construction.

The assembly above described is then inserted into an outer container 31 formed of Mumetal and of generally box-like form with one open end and provided at the other end, on the interior thereof, with a moulding 32 of plastics material in which is set the four terminal pins 33 having their outer ends projecting through the end of the outer container 31 and having their inner ends 34 projecting inwardly beyond the moulding so as to be ready for connection to the ends 35 of the windings from the bobbins.

The complete tape-head is then finally secured together by means of suitable screws 36 passing through the sides of the outer container and engaging one or both of the parallel sides of the inner housing member 19.

A further advantage arising out of the improved form of head is that it enables parts of the head to be replaced in the event of any failure, as the inner housing member 19 can be easily removed from the outer container and parts, such as a wound bobbin 29 or laminated core thereof, may be replaced if desired without any detriment to the efficiency of the head as the removal of the bobbin or core in no way interfere with the alignment of the gaps between the pole pieces. Hence there can be a considerable saving in cost of the windings or laminated core, complete replacement of the head is unnecessary and replacement of the faulty part only can be carried out at relatively little expense.

In an alternative embodiment of the invention, instead of using separate fixture plates the four pole elements may be held rigidly in a single fixture member and this may be brought about by moulding the pole elements in a moulding of plastics material which rigidly holds the ends of the pole elements and acts as a destructible jig in the same manner as the part indicated at 28 in FIGURE 6 of the above described embodiment. Otherwise the steps of such alternative method would be substantially as previously described.

What I claim then is:

1. The method of making a pole piece assembly for use in manufacturing a tape-head having at least two electro-magnets comprising, performing in the order claimed, the steps of; providing pairs of pole elements, interposing gap spacer elements between the opposed pole elements of each pair, forming a sub-assembly by rigidly fixing the one set of ends of the pole elements and interposed gap spacer elements in a fixture member, attaching said sub-assembly to a housing member having a front face so that the pole elements are located within the housing member and the fixture member is located outside the front face of the housing member, and removing the material of the fixture member to leave exposed pole faces at the ends of the pole elements flush with the front face of the housing member.

2. The method of making a pole piece assembly for use in manufacturing a tape-head having at least two electro-magnets comprising, performing in the order claimed, the steps of; providing two groups of pole elements and two fixture plates, rigidly fixing the one set of ends of the pole elements of each group to a fixture plate, providing a set of gap spacer elements, forming a sub-assembly by assembling together the two fixture plates and attached pole elements with the gap spacer elements interposed between the fixture plates, providing a housing member having a front face, attaching the said sub-assembly to the housing member so that the pole elements are located within the housing member and the fixture plates are located outside the front face of the housing member, and machining away the material of the fixture plates to leave exposed pole faces at the ends of the pole elements, flush with the front face of the housing member.

3. The method of making a pole piece assembly for use in manufacturing a tape-head having at least two electro-magnets comprising, performing in the order claimed, the steps of; providing two groups of pole elements and two fixture plates, each pole element comprising a metal strip and each fixture plate being of flat rectangular form having recesses in one longitudinal edge, bending one end of each pole face element at right angles to form a pole face lug, rigidly fixing the one set of ends of the pole elements of each group to a fixture plate by securing said pole face lugs in said recesses in the fixture plate, so that each pole element extends in a plane which is substantially parallel to the plane of its associated fixture plate, providing a set of gap spacer elements forming a sub-assembly by assembling together the two fixture plates and attached pole elements with the gap spacer elements interposed between the fixture plates, providing a housing member having a front face, attaching the said sub-assembly to the housing member so that the pole elements are located within the housing member and the fixture plates are located outside the front face of the housing member, and machining away the material of the fixture plates to leave exposed pole faces at the ends of the pole elements, flush with the front face of the housing member.

4. The method of making a pole piece assembly for use in manufacturing a tap-head having at least two electro-magnets comprising, performing in the order claimed, the steps of; providing two groups of pole elements and two fixture plates, each pole element comprising a metal strip and each fixture plate being of flat rectangular form having recesses in one longitudinal edge, bending one end of each pole face element at right angles to form a pole face lug, rigidly fixing the one set of ends of the pole elements of each group to a fixture plate by securing said pole face lugs in said recesses in the fixture plate so that each pole element extends in a plane which is substantially parallel to the plane of its associated fixture plate, machining one face of each fixture plate to provide accurately flat surfaces, providing a set of gap spacer elements, forming a sub-assembly by assembling together the two fixture plates and attached pole elements with the gap spacer elements interposed between the fixture plates and the machined flat surfaces of the fixture plates in engagement, providing a housing member having a front face, attaching the said sub-assembly to the housing member so that the pole elements are located within the housing member and the fixture plates are located outside the front face of the housing member, and machining away the material of the fixture plates to leave exposed pole faces at the ends of the pole elements, flush with the front face of the housing member.

5. The method of making a pole piece assembly for use in manufacturing a tape-head having at least two electro-magnets comprising, performing in the order claimed, the steps of; providing two groups of pole elements and two fixture plates, rigidly fixing the one set of ends of the pole elements of each group to a fixture plate, providing a set of gap spacer elements, forming a sub-assembly by assembling together the two fixture plates and attached pole elements with the gap spacer elements interposed between the fixture plates, providing a housing member of U shape, the base of the U being of outwardly convex form to constitute the front face of the tape-head and having an opening therein, attaching the said sub-assembly to the housing member so that the pole elements are located within the housing member and the fixture plates are located outside the front face of the housing member, with edge portions of the fixture plates engaging in said opening, and machining away the material of the fixture plates to leave exposed pole faces at the ends of the pole elements, flush with the front face of the housing member.

6. The method of making a pole piece assembly for use in manufacturing a tape-head having at least two electro-magnets comprising, performing in the order claimed, the steps of; providing two groups of pole elements and two fixture plates, rigidly fixing the one set of ends of the pole elements of each group to a fixture plate, providing a set of gap spacer elements, forming a sub-assembly by assembling together the two fixture plates and attached pole elements with the gap spacer elements interposed between the fixture plates, providing a housing member of U shape, the base of the U being of outwardly convex form to constitute the front face of the tape-head and having an opening therein, attaching the said sub-assembly to the housing member so that the pole elements are located within the housing member and the fixture plates are located outside the front face of the housing member, with edge portions of the fixture plates engaging in said opening, providing a screening plate assembly of at least one screening plate, assembling said screening plate assembly into the housing member to lie in between the pairs of pole elements with the front edges of the screening assembly engaging through said opening in the front face of the housing member, rigidly holding together the combination of housing member, said sub-assembly and screening plate assembly, and machining away the material of the fixture plates and screening assembly projecting from the front face of the housing member to leave exposed pole faces at the ends of the pole elements flush with the front face of the housing member.

7. The method of making a pole piece assembly for use in manufacturing a tape-head having at least two electro-magnets comprising; performing in the order claimed, the steps of; providing two groups of pole elements and two fixture plates, rigidly fixing the one set of ends of the pole elements of each group to a fixture plate, providing a set of gap spacer elements, forming a sub-assembly by assembling together the two fixture plates and attached pole elements with the gap spacer elements interposed between the fixture plates, providing a housing member having a front face, attaching the said sub-assembly to the housing member so that the pole elements are located within the housing member and the fixture plates are located outside the front face of the housing member, machining away the material of the fixture plates to leave exposed pole faces at the ends of the pole elements, flush with the front face of the housing member, providing bobbins having windings thereon, inserting one bobbin over each pole element within the housing member, providing laminations for each bobbin, inserting laminations within the bobbins to lie on opposite sides of each pole element within a bobbin, bending the projecting ends of the laminations inwards towards one another and interengaging same to form the complete cores of the separate electromagnets.

8. The method of making a pole piece assembly for use in manufacturing a tape-head having at least two electro-magnets comprising, performing in the order claimed, the steps of; providing two groups of pole elements and two fixture plates, rigidly fixing the one set of ends of the pole elements of each group to a fixture plate, providing a set of gap spacer elements, forming a sub-assembly by assembling together the two fixture plates and attached pole elements with the gap spacer elements interposed between the fixture plates, providing a housing member having a front face, attaching the said sub-assembly to the housing member so that the pole elements are located within the housing member and the fixture plates are located outside the front face of the housing member, and machining away the material of the fixture plates to leave exposed pole faces at the ends of the pole elements, flush with the front face of the housing member, providing bobbins having windings thereon, inserting one bobbin over each pole element within the housing member, providing laminations for each bobbin, inserting laminations within the bobbins to lie on opposite sides of each pole element within a bobbin, bending the projecting ends of the laminations inwards towards one another and interengaging same to form the complete cores of the separate electro-magnets, providing a container having an open mouth, a base, and a plastics moulding having terminal connections located in said base, and insertnig said housing member into said container through said open mouth and connecting the windings on the bobbins to said terminal connections.

9. The method of manufacture of a tape-head having at least two electro-magnets comprising performing in the order claimed, the steps of; providing two groups of pole elements and two fixture plates, each pole element comprising a metal strip and each fixture plate being of flat rectangular form having recesses in one longitudinal edge, bending one end of each pole face element at right angles to form a pole face lug, rigidly fixing the one set of ends of the pole elements of each group to a fixture plate, by securing said pole face lugs in said recesses in the fixture plate so that each pole element extends in a plane which is substantially parallel to the plane of its associated fixture plate, machining one face of each fixture plate to provide accurately flat surfaces, providing a set of gap spacer elements, forming a sub-assembly by assembling together the two fixture plates and attached pole elements with the gap spacer elements interposed between the fixture plates and the machined flat surfaces of the fixture plates in engagement, providing a housing member of U shape, the base of the U being of outwardly convex form to constitute the front face of the tape-head and having an opening therein, attaching the said sub-assembly to the housing member so that the pole elements are located within the housing member and the fixture plates are located outside the front face of the housing member, with edge portions of the fixture plates engaging in said opening, providing a screening plate assembly of at least one screening plate, assembling said screening plate assembly into the housing member to lie in between the pairs of pole elements with the front edges of the screening assembly engaging through said opening in the front face of the housing member, rigidly holding together the combination of housing member, said sub-assembly and screening plate assembly, and machining away the material of the fixture plates and screening assembly projecting from the front face of the housing member to leave exposed pole faces at the ends of the pole elements flush with the front face of the housing member, providing bobbins having windings thereon, inserting one bobbin over each pole element within the housing member, providing laminations for each bobbin, inserting laminations within the bobbins to lie on opposite sides of each pole element within a bobbin, bending the projecting ends of the laminations inwards towards one another and interengaging same to form the complete cores of the separate electromagnets, providing a container having an open mouth, a base, and a plastics moulding having terminal connections located in said base, and inserting said housing member into said container through said open mouth and connecting the windings on the bobbins to said terminal connections.

References Cited

UNITED STATES PATENTS

| | | |
|---|---|---|
| 2,920,149 | 1/1960 | Koren. |
| 3,211,843 | 10/1965 | Dundovic. |
| 3,222,461 | 12/1965 | Wood. |

JOHN F. CAMPBELL, *Primary Examiner.*

J. L. CLINE, *Assistant Examiner.*